Jan. 6, 1931.  F. H. WINTER  1,788,222
ELECTRICAL REGULATOR
Filed Jan. 23, 1930
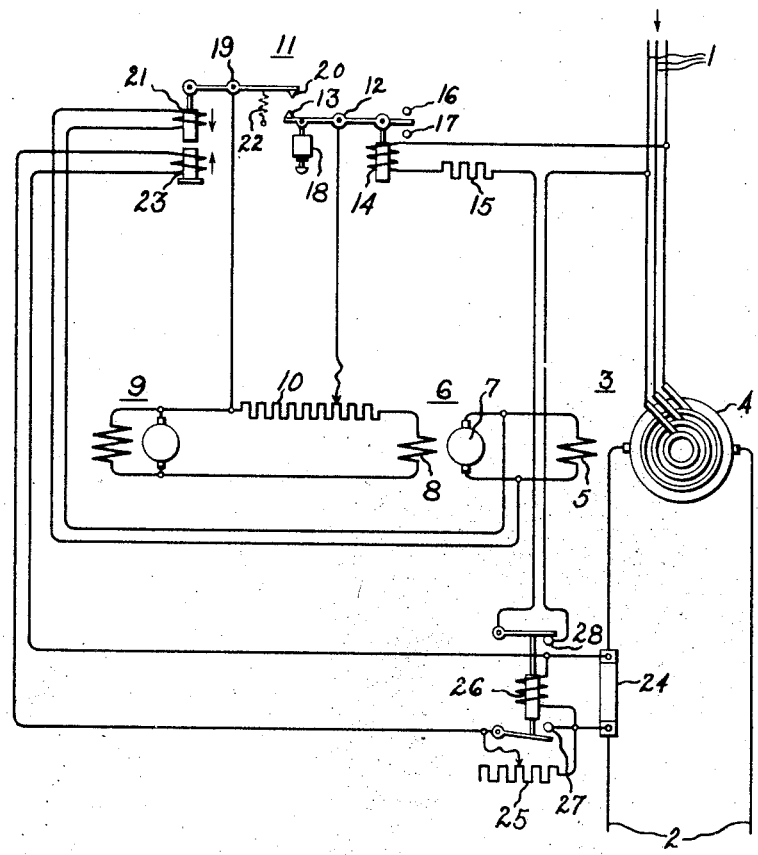
Inventor:
Fred H. Winter,
by Charles E. Tullar
His Attorney.

Patented Jan. 6, 1931

1,788,222

UNITED STATES PATENT OFFICE

FRED H. WINTER, OF SCHENECTADY, NEW YORK, ASSIGNOR TO GENERAL ELECTRIC COMPANY, A CORPORATION OF NEW YORK

ELECTRICAL REGULATOR

Application filed January 23, 1930. Serial No. 422,903.

My invention relates to electrical regulators, and particularly to regulators for synchronous motors and synchronous converters.

Due to the fact that synchronous motors when under or over-excited take a lagging or leading current respectively, they have been used to a considerable extent to regulate the voltage at the load end of transmission systems. Thus by equipping such a machine with a voltage regulator it will automatically change its excitation and hence its power factor in such a way as to maintain constant voltage at the receiving end of the line, for a leading current flowing through the line reactance will produce a voltage rise along the line, while a lagging current will produce the customary voltage drop. When operated in this manner at no load synchronous motors are usually referred to as synchronous condensers.

A synchronous converter being but a species of synchronous motor so far as its characteristics on the alternating current side are concerned may also be used to regulate the voltage at the load end of a transmission system, as well as at any other suitable point in the system.

It has been found, however, that at the low power factors at which such machines must sometimes operate, in order to hold the line voltage to its proper value, the current through them becomes so great as to cause undue heating with its resultant injurious effect on the insulation of the coils. To prevent this, the voltage regulator is provided with limit stops so that if the line voltage tends to go above or below certain maximum or minimum limits respectively, which are determined by the current carrying capacity of the machine, the regulator will cease to function as an alternating current voltage regulator and will merely hold constant field excitation on the machine. If now at a time when the machine is lightly loaded and especially if at this time the line voltage tends to be higher than that for which the proper limit stop is set, a sudden load is thrown on the machine it is very likely to pull out of synchronism for the machine is at that time operating with a low value of excitation. In order to counteract this tendency I propose to add means to the voltage regulator associated with such a machine which will cause the machine to operate with increased excitation as a result of increases in load thereon at times when the regulator is restrained by one or the other of the limit stops and which will tend to increase its excitation upon increases in load at any time.

It is an object of my invention to provide a new and improved regulator for synchronous motors and converters.

It is a further object of my invention to provide means for recalibrating the antihunting element of a voltage regulator associated with synchronous motors or converters in accordance with changes in load thereon.

My invention will be better understood from the following description taken in connection with the accompanying drawing and its scope will be pointed out in the appended claims.

Referring now to the single figure of the accompanying drawing, which is a diagrammatic representation of my invention as applied to a regulator which is connected to a synchronous converter, 1 represents an alternating current circuit, which may be considered to be a transmission line, which is connected to a direct current supply circuit 2 through a synchronous converter 3 having an armature 4 and a field winding 5. Connected so as to energize field winding 5 is an exciter 6 having an armature 7, whose terminals are connected to field winding 5, and field winding 8 which is excited from any suitable source of current such as the shunt generator 9 illustrated. A resistance 10 is connected in series with the exciter field winding 8.

Connected to circuit 1 and machine 3 is a voltage regulator 11 which as shown is of the conventional Tirrill type. This regulator comprises a main control lever 12, main control contact 13 and main control coil 14 which is connected across line 1 in series with a suitable current limiting resistor 15. Limit stops 16 and 17 are provided to limit the movement of main control lever 12. Dashpot 18 is provided so as to dampen the movements of the main control lever 12. The anti-hunting elements of the regulator comprise lever 19, contact 20 and operating coil 21 which is connected across the terminals of armature 7 of exciter 6. A suitable spring 22 is connected to lever 19 in such a way as to oppose the pull of coil 21. Contacts 13 and 20 are connected across a portion of resistance 10.

Recalibrating means are provided for causing the regulator to hold a higher excitation on machine 3 at a time when lever 12 is being restrained by either of the limit stops and a load is thrown on the machine and for tending to hold a higher excitation whenever the load increases. The recalibrating means, as illustrated, comprises a coil 23 connected across a shunt 24 in line 2. An adjustable resistance 25 is connected in series with this coil and is arranged to be short circuited by closure of the contacts 27 of relay 26 when the current in line 2 exceeds a predetermined value.

The operation of my regulator is as follows. With machine 3 operating under normal voltage conditions main control lever 12 will be free to move between limit stops 16 and 17 with the result that regulator 11 will function in the customary manner to hold constant voltage at the terminals of this machine. Briefly, this action is as follows. If there is no tendency for the voltage on line 1 to vary spring 22 will cause contacts 13 and 20 to engage thereby short-circuiting resistance 10 and causing an increase in the voltage of exciter 6. This increase in voltage causes an increase in the pull of coil 21 thereby causing contacts 13 and 20 to separate with the result that resistance 10 is reinserted in the circuit of exciter field winding 8. This in turn will decrease the voltage of the exciter 6 with the result that spring 22 will again overpower the pull of coil 21. This action is extremely rapid and results in a practically constant current through field winding 5 of machine 3. If now the voltage of line 1 should vary contact 13 will move up or down depending upon whether the voltage was an increase or a decrease with the result that arm 19 will shift to a new mean position in which the new mean tension of spring 22 will be balanced by a new mean pull of coil 21 which will be produced by the new average terminal voltage of exciter 7 which is necessary to maintain constant voltage on line 1. As soon as normal voltage on line 1 is again attained arm 12 will come to rest.

By providing limit stops 16 and 17 the extreme positions of arm 12 are limited so that should the voltage of line 1 tend to go above or below certain limits which would be determined by the rating of machine 3, arm 12 will encounter one or the other of these stops with the result that the regulator will cease to function in a manner to hold constant voltage on line 1 and will merely hold constant excitation on machine 3 through the usual action of the anti-hunting elements as explained above. Were it not for these limit stops the low power factor at which machine 3 might have to operate in order to maintain constant voltage might produce such high currents as to result in injurious heating of the machine.

Recalibrating coil 23 is connected to shunt 24 in such a way that its magneto motive force opposes that of coil 21. As a result if arm 12 is against stop 16 the effect of an increase in load on machine 3 would be to increase the voltage across shunt 24 and hence the current through coil 23 with the result that the pull of anti-hunting coil 21 would be weakened thereby causing contacts 13 and 20 to remain in engagement a greater proportion of the time thereby to increase the excitation of machine 3. As the fact that arm 12 is against limit stop 16 indicates that the voltage of line 1 is high the machine will have been operating with a lagging power factor and consequently at a low value of excitation. Therefore, the effect of coil 23 will be to recalibrate the anti-hunting elements of regulator 11 in such a way that when machine 3 is operating at low excitation and the load is applied the excitation will be increased in proportion to the increase in load thereby counteracting any tendency for the machine to break out of step. Relay 26 is arranged to short circuit resistance 25 at a certain value of load current. Thus, if there should be an addition of a large enough load on machine 3 the relay 26 will operate at once to short circuit resistance 25 and cause an increased flow through coil 23 thereby providing for an extra large excitation on machine 3.

Although I have shown my invention as applied to a regulator for regulating a synchronous converter, it will be obvious to those skilled in the art that its broad principle is equally well applicable to regulators for regulating synchronous motor generator sets or synchronous motor driving mechanical loads, the only difference being that in the latter case the current in coil 23 would be connected to be responsive to the load component of the motor current.

In case it is necessary to provide for an extremely rapid increase in excitation of machine 3 at a time when load is applied to machine 3, an additional pair of normally closed contacts 28 will be added to relay 26 these contacts being connected in the circuit with main control coil 14. As a result when relay 26 operates due to a sufficiently great increase in current in circuit 2 the circuit to coil 14 will be broken thereby causing contact 13 to move toward contact 20. At the same time, of course, contact 20 will be moved toward contact 13 as a result of the weakening of the pull of coil 21. The speed of contact 13 toward contact 20 will therefore be added to the speed of contact 20 toward contact 13 with the result that the relative speed of the two contacts toward each other will be materially increased, causing a quicker action of the regulator.

While I have shown and described a particular embodiment of my invention it will be obvious to those skilled in the art that changes and modifications may be made without departing from my invention and I, therefore, aim in the appended claims to cover all such changes and modifications which fall within the true spirit and scope of my invention.

What I claim as new and desire to secure by Letters Patent of the United States is:

1. In combination, an alternating current circuit, a synchronous machine for translating energy received from said circuit into energy in some other form, means for regulating the voltage at the terminals of said machine through control of the excitation of said machine, and means for limiting the operating range of said regulating means, said regulating means including means for increasing the excitation of said machine upon an increase in load regardless of said limiting means.

2. In combination, an alternating current supply circuit, a direct current load circuit, a synchronous converter connected therebetween, means for regulating the voltage of said alternating current circuit through control of the excitation of said converter, and means for limiting the maximum and minimum excitations of said converter at light loads, said regulating means including means for increasing the excitation of said machine upon an increase in load thereon regardless of said limiting means.

3. In combination, an electric circuit, a synchronous machine connected to said circuit, a vibratory contact voltage regulator connected to said circuit and said machine, limit stops for the main control element of said regulator, and means for recalibrating the anti-hunting coil of said regulator in accordance with variations in the power output of said machine.

4. In combination, a voltage regulator of the vibratory contact type including main control means and electro-magnetically operated anti-hunting means, a synchronous machine regulated thereby, limit stops for said main control means, and means for varying the flux through said electromagnetic operating means inversely with changes in load on said regulated machine.

5. In combination, an alternating current circuit, a direct current circuit, a synchronous converter connected between said circuits, a vibratory contact type voltage regulator, said regulator including main control means and anti-hunting means, means connecting said main control means to be responsive to the voltage of said alternating current circuit, limit stops for said main control means, and means for causing said anti-hunting means to tend to hold a higher excitation of said converter for a given position of said main control means in proportion to increases in load on said converter.

6. In a regulating system, in combination, an alternating current supply circuit, a direct current load circuit, a synchronous converter connected between said circuits, regulating means for varying the excitation of said converter in response to variations in voltage on said alternating current circuit in such a manner that the wattless current taken by said converter maintains substantially constant voltage on said alternating current circuit, limiting means associated with said regulating means for limiting the minimum and maximum excitation of said converter at light loads, said regulating means including vibratory anti-hunting means and means associated with said anti-hunting means and with said direct current circuit for causing said anti-hunting means to increase the excitation of said converter in proportion to increases in current in said direct current only when said limiting means are functioning.

7. In a regulating system, in combination, a synchronous converter, a voltage regulator associated therewith, said regulator including electromagnetically operated main control means connected across the alternating current terminals of said machine, limit stops for said main control means, electromagnetically controlled anti-hunting means, means responsive to current in the direct current side of said converter for weakening the electromagnetic controlling means of said anti-hunting means in proportion to the value of said current, and means for increasing the weakening effect of said last mentioned means if said current exceeds a predetermined value.

8. In a regulating system, in combination, a synchronous converter, a voltage regulator associated therewith, said regulator including electromagnetically operated main control means connected across the alternating current terminals of said machine, limit stops for said main control means, electromagnetically controlled anti-hunting means, means responsive to current in the direct current side of said converter for weakening the electromagnetic controlling means of said anti-hunting means in proportion to the value of said current, and means for breaking the circuit of said electromagnetically operated main control means if said current exceeds a predetermined value.

9. In a regulating system, in combination, a synchronous converter, a voltage regulator associated therewith, said regulator including electromagnetically operated main control means connected across the alternating current terminals of said machine, limit stops for said main control means, electromagnetically controlled anti-hunting means, means responsive to current in the direct current side of said converter for weakening the electromagnetic controlling means of said anti-hunting means in proportion to the value of said current, and means for increasing the weakening effect of said last mentioned means and for breaking the circuit of said electromagnetically operated main control means, if said current exceeds a predetermined value.

10. In a regulating system, in combination, an alternating current supply circuit, a direct current load circuit, a synchronous converter connected between said circuits, means for energizing the field winding of said converter, a vibratory contact type regulator including a main control means, an operating magnet therefor connected across said alternating current circuit, anti-hunting means and an operating coil therefor connected to be responsive to the degree of excitation of said converter, limit stops associated with said main control means, a recalibrating coil associated with the operating coil of said anti-hunting means, means for energizing said recalibrating coil so that the current through it is proportional to the current in the direct current load circuit and so that its magneto-motive force opposes that of the operating coil of said anti-hunting means, a resistance in series with said recalibrating coil, and relay means for short-circuiting said resistance and opening the circuit of the operating magnet of said main control means when the current in said direct current load circuit exceeds a predetermined amount.

In witness whereof, I have hereunto set my hand this 22nd day of January, 1930.

FRED H. WINTER.